(12) United States Patent
Godina (10) Patent No.: US 11,554,423 B2
(45) Date of Patent: Jan. 17, 2023

(54) POWER DRILL ACCESSORIES

(71) Applicant: Ricardo Godina, South Gate, CA (US)

(72) Inventor: Ricardo Godina, South Gate, CA (US)

( * ) Notice: Subject to any disclaimer, the term of this patent is extended or adjusted under 35 U.S.C. 154(b) by 9 days.

(21) Appl. No.: 17/177,626

(22) Filed: Feb. 17, 2021

(65) Prior Publication Data
US 2022/0258249 A1 Aug. 18, 2022

(51) Int. Cl.
*B23B 31/40* (2006.01)

(52) U.S. Cl.
CPC .......... *B23B 31/4093* (2013.01); *B23B 31/40* (2013.01); *B23B 2215/72* (2013.01); *B23B 2231/04* (2013.01); *B23B 2260/09* (2013.01); *Y10T 279/1074* (2015.01)

(58) Field of Classification Search
CPC . B23B 31/4093; B23B 31/40; B23B 2215/72; B23B 2231/04; B23B 2260/09; Y10T 279/1074
See application file for complete search history.

(56) References Cited

U.S. PATENT DOCUMENTS

| | | | | |
|---|---|---|---|---|
| 2,627,773 A | * | 2/1953 | Barnett | B25B 13/54 279/2.19 |
| 3,623,741 A | * | 11/1971 | Reeder, Jr. | B23B 31/40 279/2.2 |
| 6,282,998 B1 | * | 9/2001 | Beach | B25B 13/06 81/437 |
| 7,464,774 B2 | | 12/2008 | Savignat et al. | |
| 8,926,236 B2 | | 1/2015 | Kauper et al. | |
| 9,562,394 B2 | | 2/2017 | Gibb et al. | |

OTHER PUBLICATIONS

Drill Chuck, https://www.grainger.com/product/JACOBS-Drill-Chuck-3L966.
Cylinder Bur SA, https://www.grainger.com/product/MONSTER-Cylinder-Bur-SA-22YA38.

\* cited by examiner

*Primary Examiner* — Boyer D Ashley
*Assistant Examiner* — Reinaldo A Vargas Del Rio (57) ABSTRACT

A pipe spinning power drill accessory a stem, shaft, first knurled assembly, second knurled assembly, first state, and second state. The first knurled assembly and the second knurled assembly are each cylindrically shaped. The first knurled assembly is centrally affixed to the stem. The shaft is centrally affixed to the first knurled assembly opposite the stem. The second knurled assembly is centrally affixed to the shaft opposite the first knurled assembly. The first knurled assembly and the second knurled assembly each selectively expand laterally. In the first state, the first knurled assembly and the second knurled assembly are each not laterally expanded. In the second state, at least one of the first knurled assembly and the second knurled assembly are laterally expanded. The stem is configured to be inserted into a chuck of a power drill. The stem is cross-sectionally hexagonally shaped and includes a region of decreased diameter.

13 Claims, 14 Drawing Sheets

POWER DRILL ACCESSORIES

CROSS-REFERENCE TO RELATED APPLICATIONS

This application claims priority to U.S. Provisional Application No. 62/870,984 filed Jul. 5, 2019, which is hereby incorporated herein by reference.

FIELD OF THE INVENTION

The present disclosure relates generally to power drills. More specifically, the present disclosure describes power drill accessories.

BACKGROUND OF THE INVENTION

In present society, there has been a copper piping is a common facet in many aspects of modern homes and buildings. Often time, there are specific means to prepare a copper pipe. This can primarily include using a tube cutter to reduce the copper pipe to a desired length. This can also include reaming the inner edge of the copper pipe where the length of the pipe was cut. Finally, the copper pipe must be sanded in order to remove copper oxide. All of these tasks are often involved in the preparation of a copper pipe. However, although necessary, the current means of performing these tasks can be laborious and time-consuming. Mainly, in performing these tasks, the user primarily has to repeatedly rotate or spin the copper pipe by hand in order to cut the length of the pipe, ream the inside edge of the pipe, and/or sand the pipe. These tasks can even prove more insurmountable if the copper pipe needed is too long and/or large for the user to handle on their own. These issues and tasks are not just limited to copper pipes but can also be applied to pipes of other materials.

BRIEF DESCRIPTION OF THE DRAWINGS

Some of the embodiments will be described in detail, with reference to the following figures, wherein like designations denote like members, wherein.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

The present disclosure includes many aspects and features. Moreover, while many aspects and features relate to, and are described in the context of pipe spinning power drill accessories, embodiments of the present disclosure are not limited to use only in this context. The instant disclosure seeks to provide power drill accessories that manipulates pipes by spinning (i.e., circumferentially rotating) them. The instant disclosure seeks to provide power drill accessories that can latch onto the inner walls of pipes as well as other hollow cylindrical structures. As used herein, "power drill" refers to drills that are electrically or air driven and may be corded or cordless (e.g., battery powered). Applicable power drills can include, but are not limited to, hammer drills, rotary hammer drills, drill presses, geared head drills, radial arm drills, magnetic drill presses, and mill drills.

In present society, copper piping is a common facet in many aspects of modern homes and buildings. Often times, there are specific means to prepare copper piping for soldering. For example, a tube cutter is used to reduce the copper pipe to a desired length. The inner edge of the copper pipe is reamed where the length of the pipe was cut. Finally, the copper pipe is sanded to remove any copper oxide that may have formed on the copper pipe. However, the current means of performing these tasks can be laborious and time-consuming. Mainly, in performing these tasks, the user primarily has to repeatedly rotate or spin the copper pipe by hand in order to cut the length of the pipe, ream the inside edge of the pipe, and/or sand the pipe. These tasks can even prove more insurmountable if the copper pipe needed is too long and/or large for the user to handle on their own. These issues and tasks are not just limited to copper pipes but can also be applied to pipes of other materials.

As seen in FIGS. 1-14, the present disclosure seeks to provide a power drill accessory, generally 100, that circumferentially spins pipes when inserted therein. The power drill accessory 100 has a first state 140 (non-expanded) and a second state 740 (expanded), which are different configurations to facilitate the pipe spinning action of the power drill accessory 100. The power drill accessory 100 and its individual components can be of any shape, size, material, features, type or kind, orientation, location, quantity, components, and arrangements of components that would allow it to fulfill the objectives and intents of the instant disclosure. However, it can be preferred that the power drill accessory 100 be of a material similar to a material that is strong, durable, tough, and/or easily manufacturable, while being compatible with the material of the pipe. It can be preferred that present invention be of a general overall size such that the power drill accessory 100 can be attached to a drill gun by one end and latched to the inner wall of a pipe (discussed further below).

Figure 1:
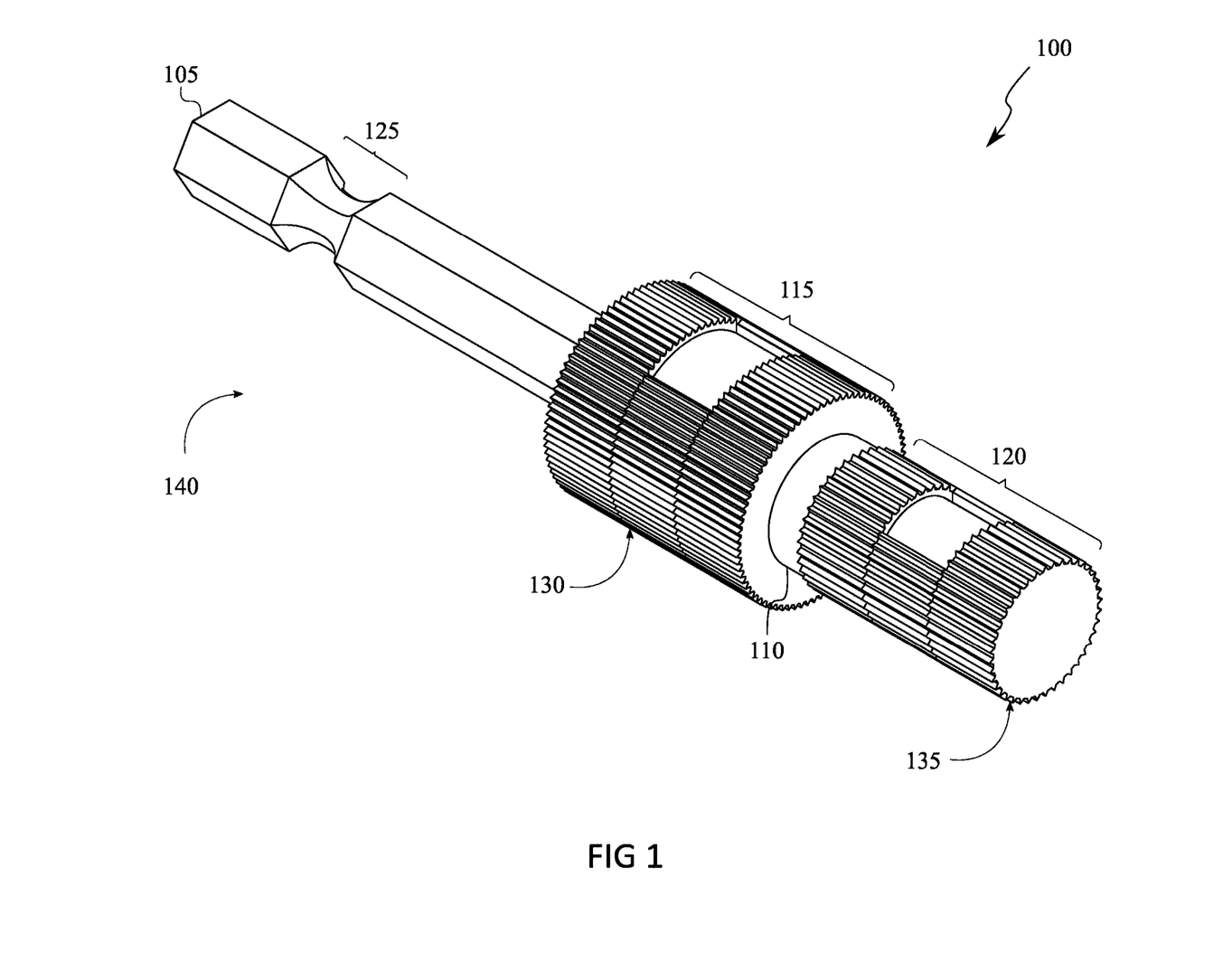
FIG. 1 depicts a perspective view of a power drill accessory in a first state, according to some embodiments.

FIG. 1 depicts a perspective view of the power drill accessory 100 in a first state 140, according to some embodiments. The power drill accessory 100 preferably includes a stem 105, a shaft 110, a first knurled assembly 115, and a second knurled assembly 120. The first knurled assembly 115 is centrally affixed to the stem 105. The first knurled assembly 115 and the second knurled assembly 120 are each cylindrically shaped. The shaft 110 is centrally affixed to the first knurled assembly 115 opposite the stem 105. The second knurled assembly 120 is centrally affixed to the shaft 110 opposite the first knurled assembly 115.

The stem 105 is preferably hexagonally shaped (e.g., similar to hex keys known in the art) and includes a region of decreased diameter 125. In other words, the stem 105 is cross-sectionally hexagonally shaped. The region of decreased diameter 125 is diametrically smaller compared to the stem 105. In other words, the diameter of the region of decreased diameter 125 is smaller than that of the stem 105. The region of decreased diameter 125 is positioned proximate to the chuck 1410 when the stem 105 is inserted therein. The first knurled assembly 115 preferably includes a first knurled disc 200, a second knurled disc 205, a first knurled cam 210, and a first cam shaft 305. The first knurled assembly 115 is diametrically larger than the stem 105, the shaft 110, and the second knurled assembly 120. The first knurled assembly 115 includes a first plurality of ridges 130 (e.g., to help the first knurled assembly 115 to engage the inner wall of pipes and lodge itself therein). The first plurality of ridges 130 are preferably circumferentially positioned about the first knurled assembly 130 and longitudinally aligned thereon. The difference in diameter of the first knurled assembly 115 and the second knurled assembly 120 allows the power drill accessory 100 to be inserted into pipes of different diameter.

Figure 2:
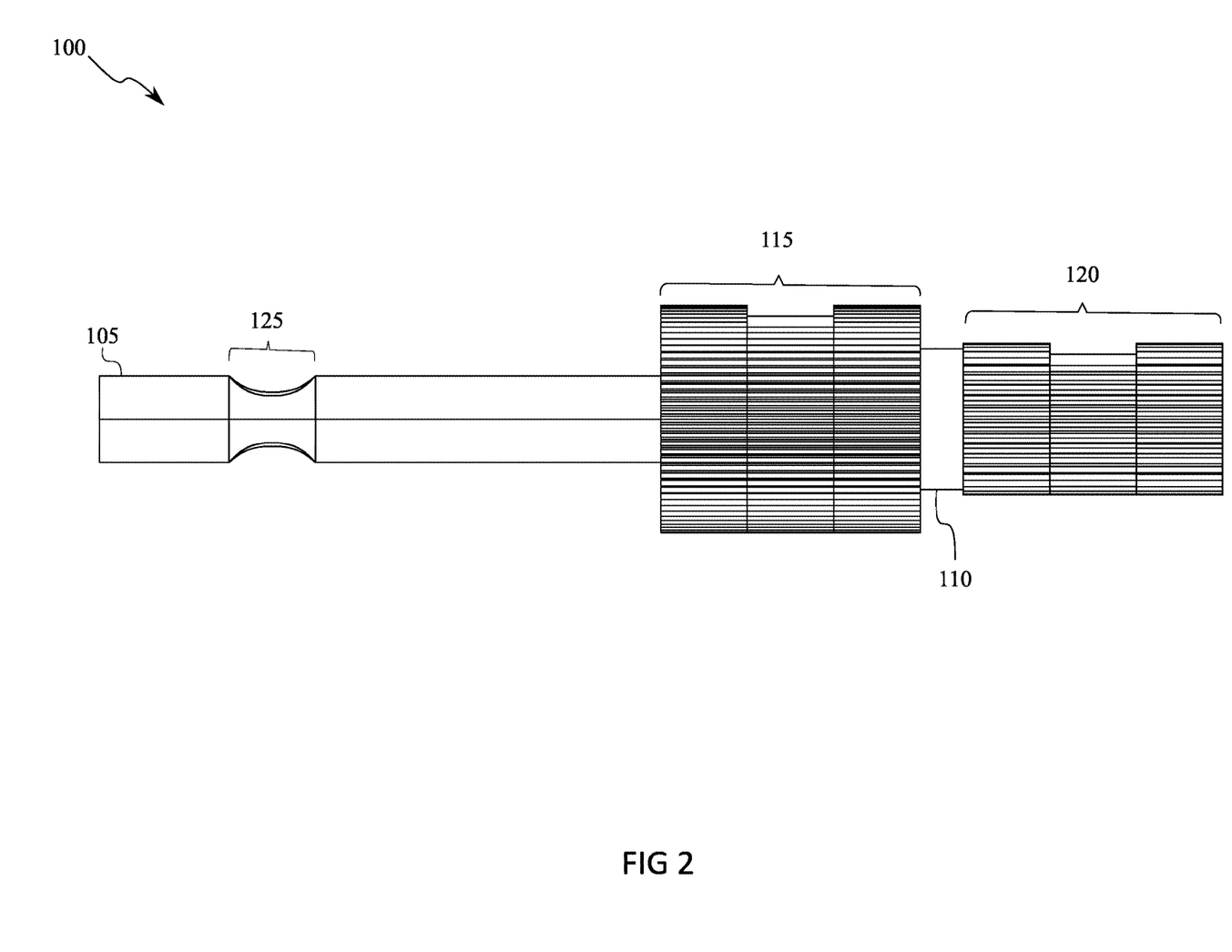
FIG. 2 depicts a side view of the power drill accessory in the first state, according to other embodiments.
Figure 3:
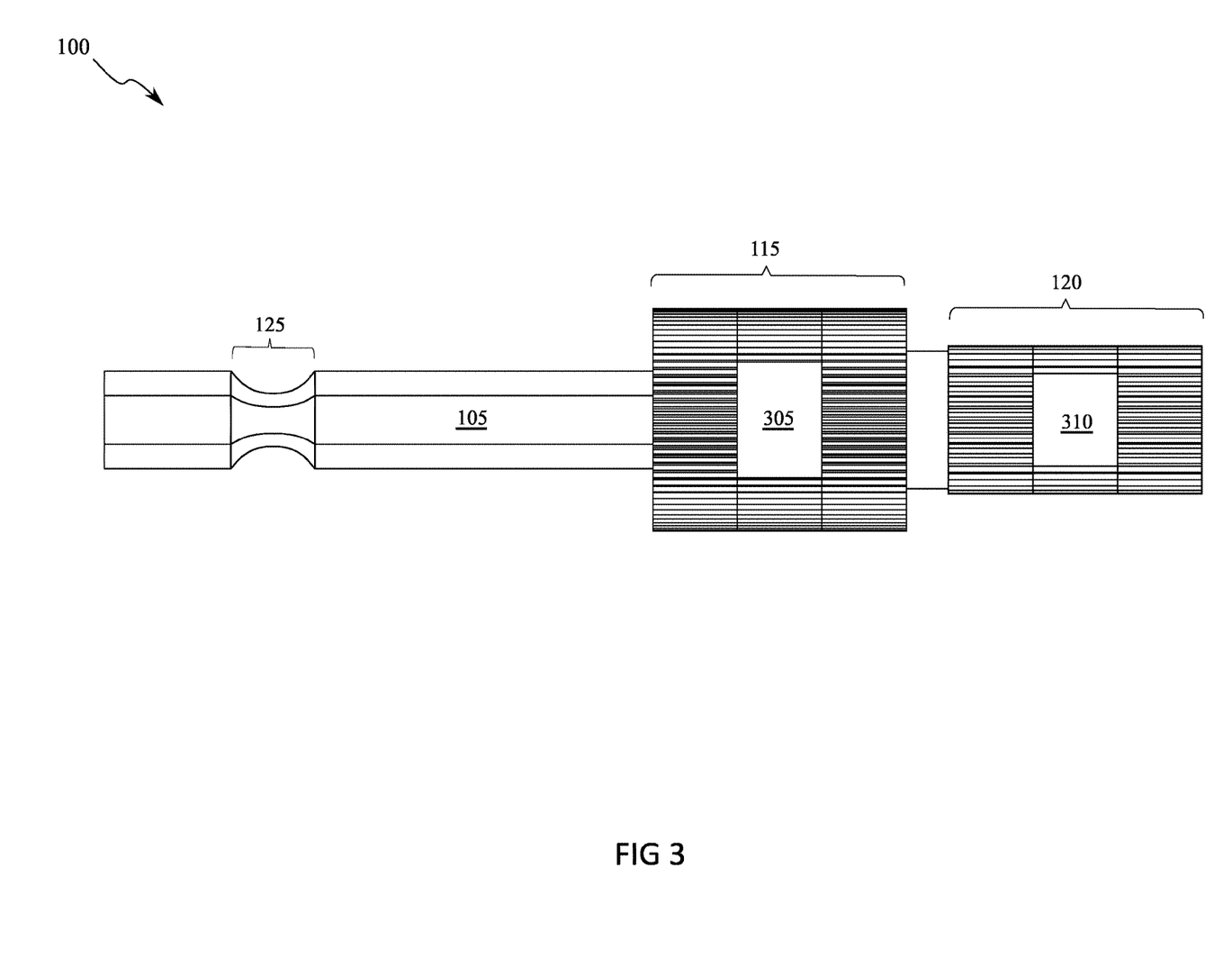
FIG. 3 depicts a top view of the power drill accessory in the first state, according to certain embodiments.
Figure 4:
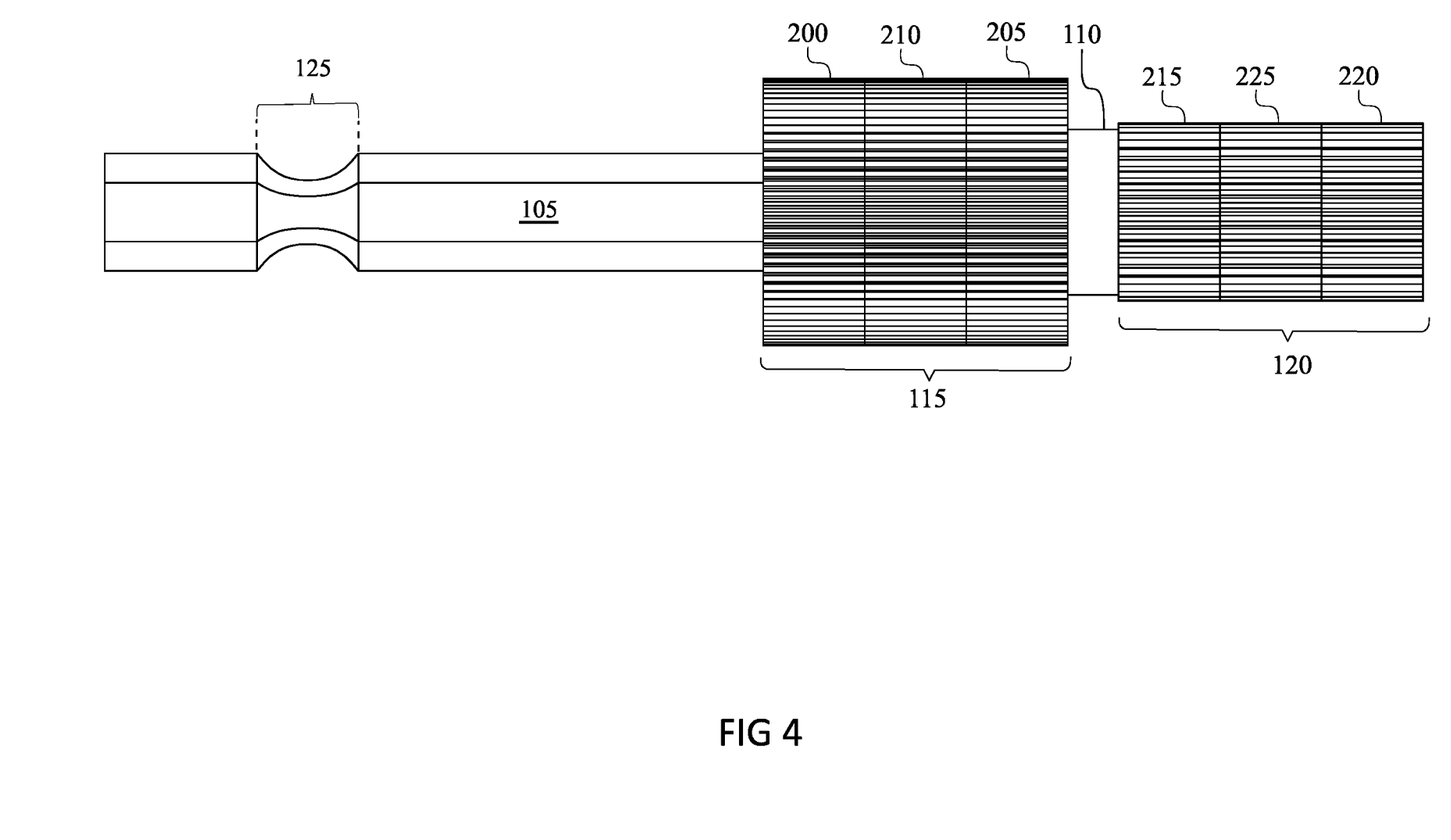
FIG. 4 depicts a bottom view of the power drill accessory in the first state, according to yet still others embodiments.
Figure 5:
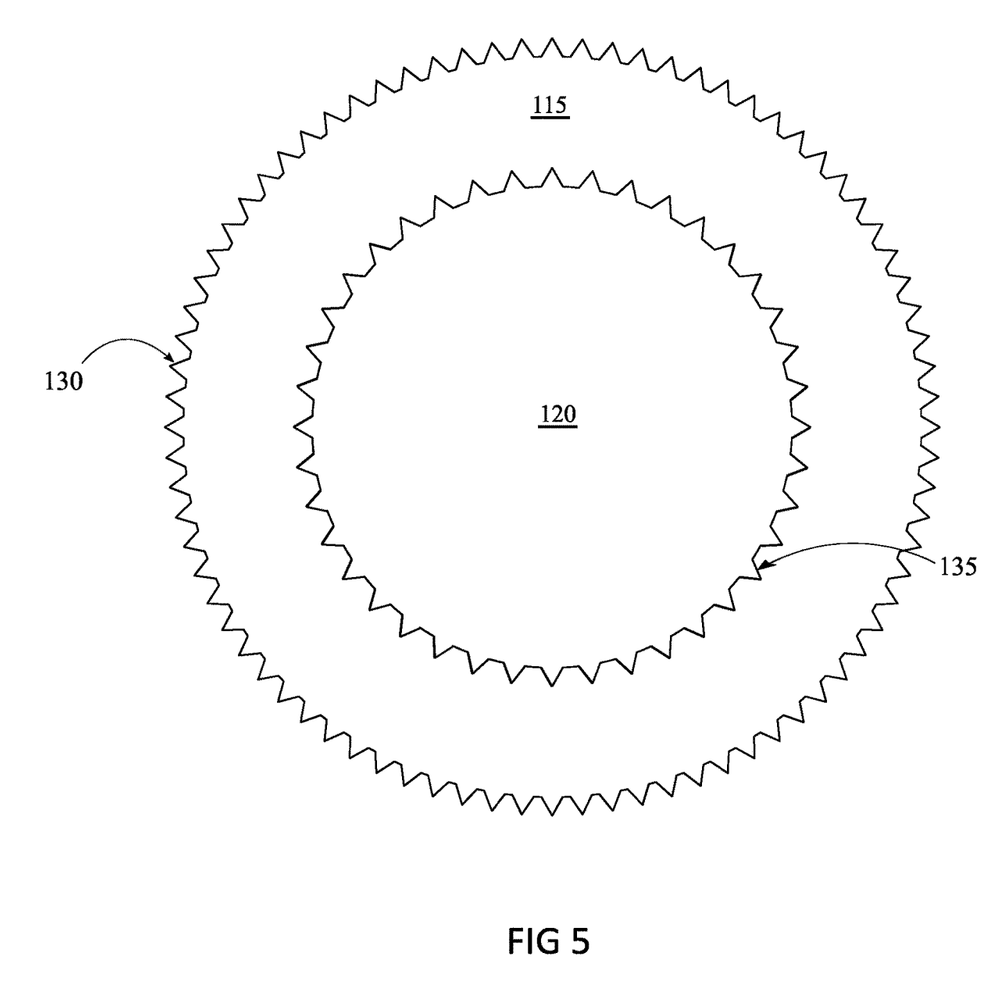
FIG. 5 depicts a front view of the power drill accessory in the first state, according to some embodiments.
Figure 6:
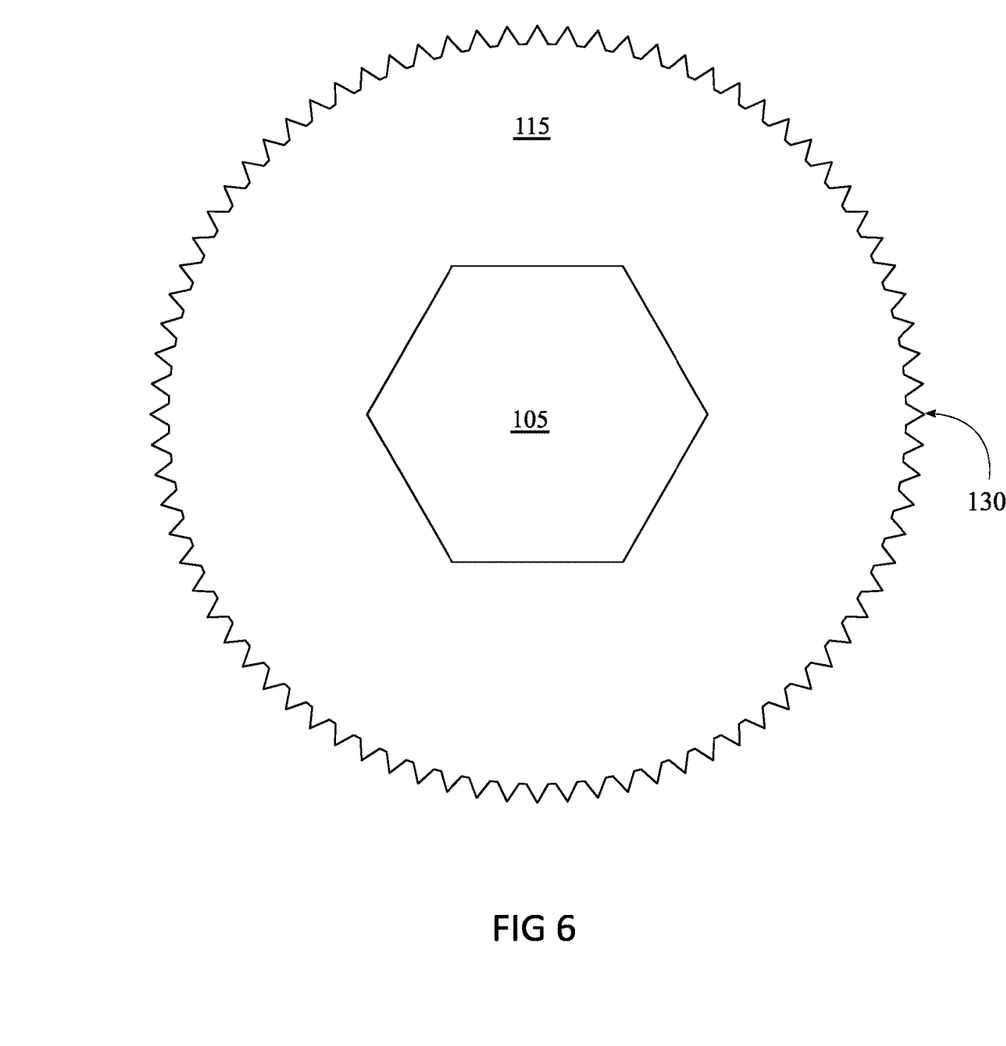
FIG. 6 depicts a rear view of the power drill accessory in the first state, according to other embodiments.
Figure 7:
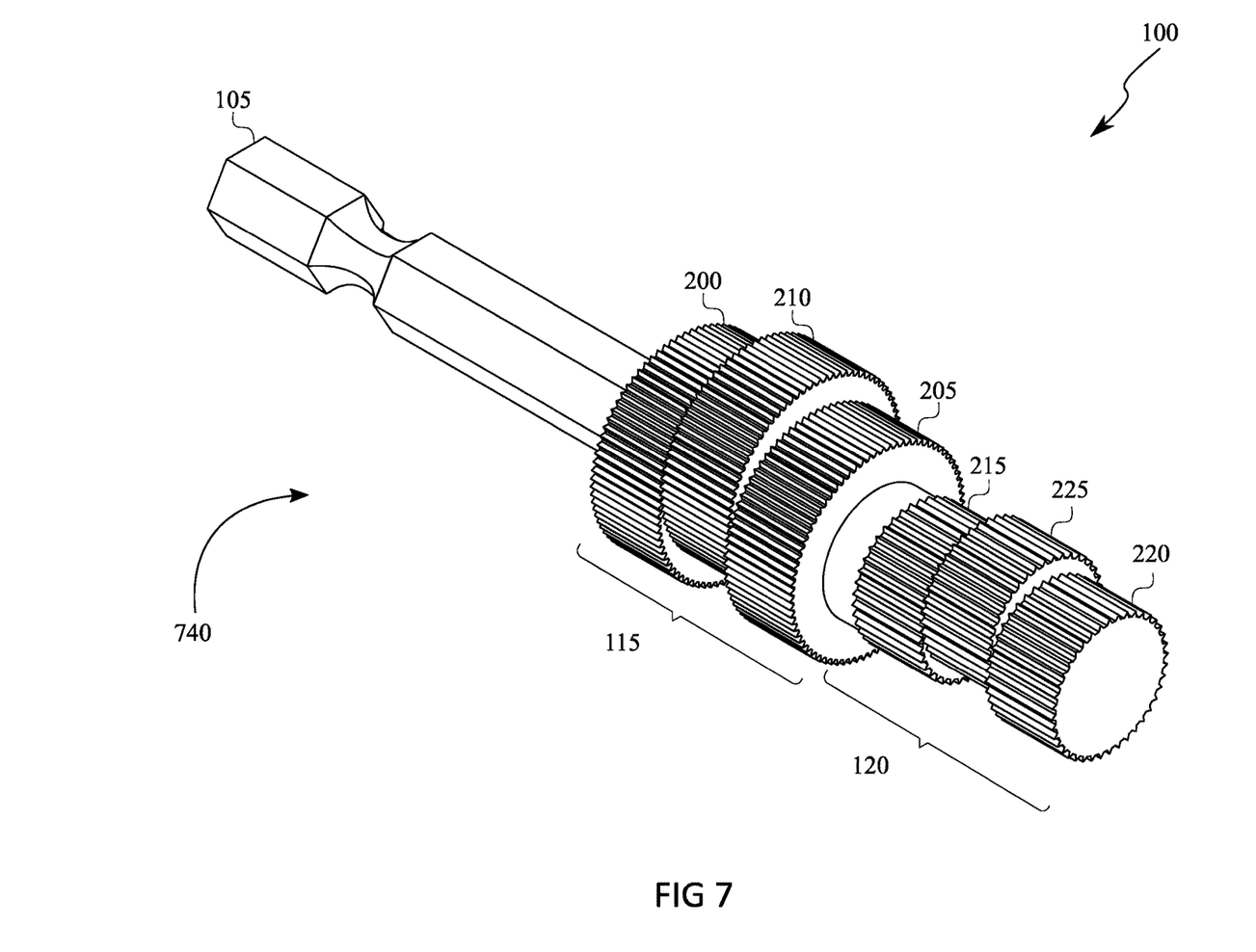
FIG. 7 depicts a perspective view of the power drill accessory in a second state, according to certain embodiments.
Figure 8:
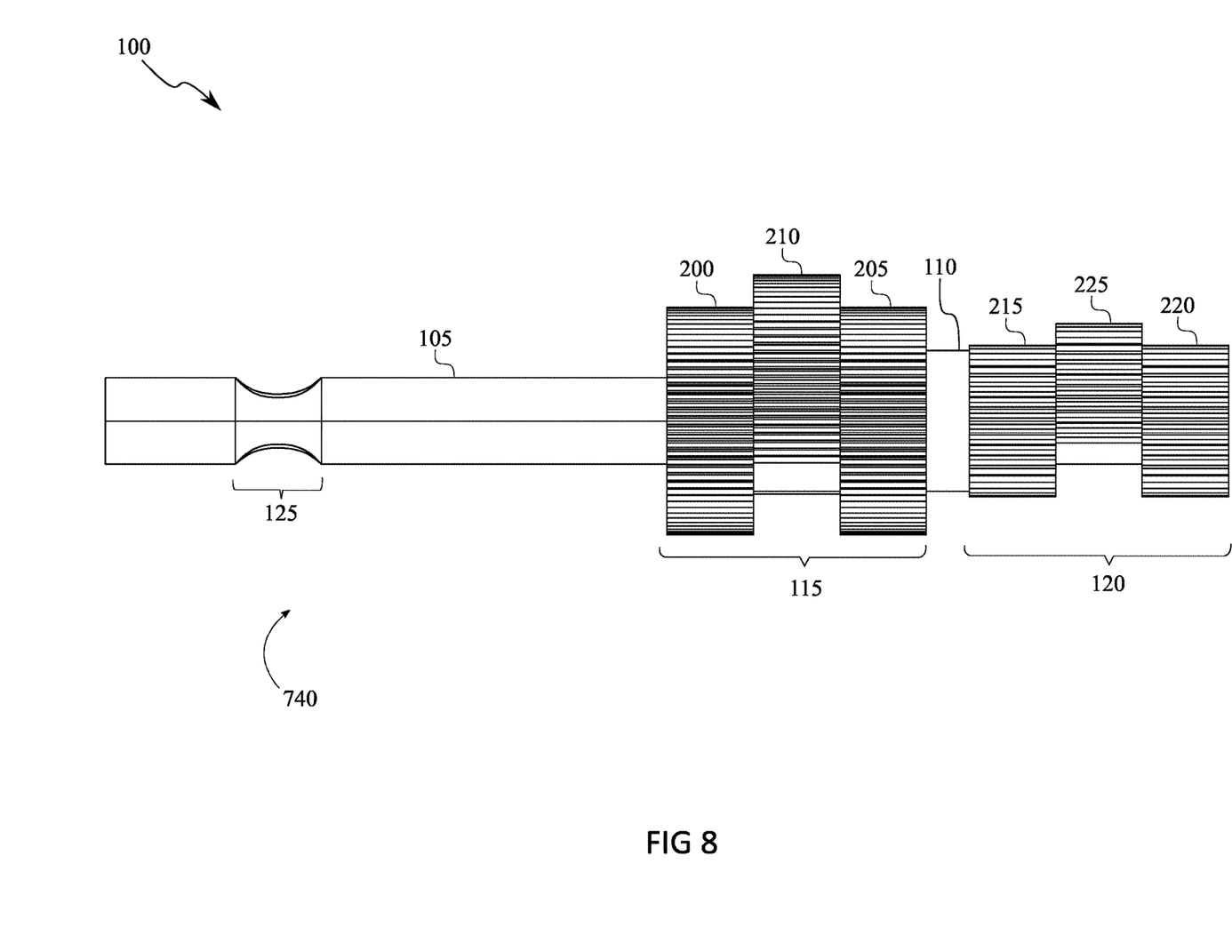
FIG. 8 depicts a side view of the power drill accessory in the second state, according to yet still others embodiments.
Figure 9:
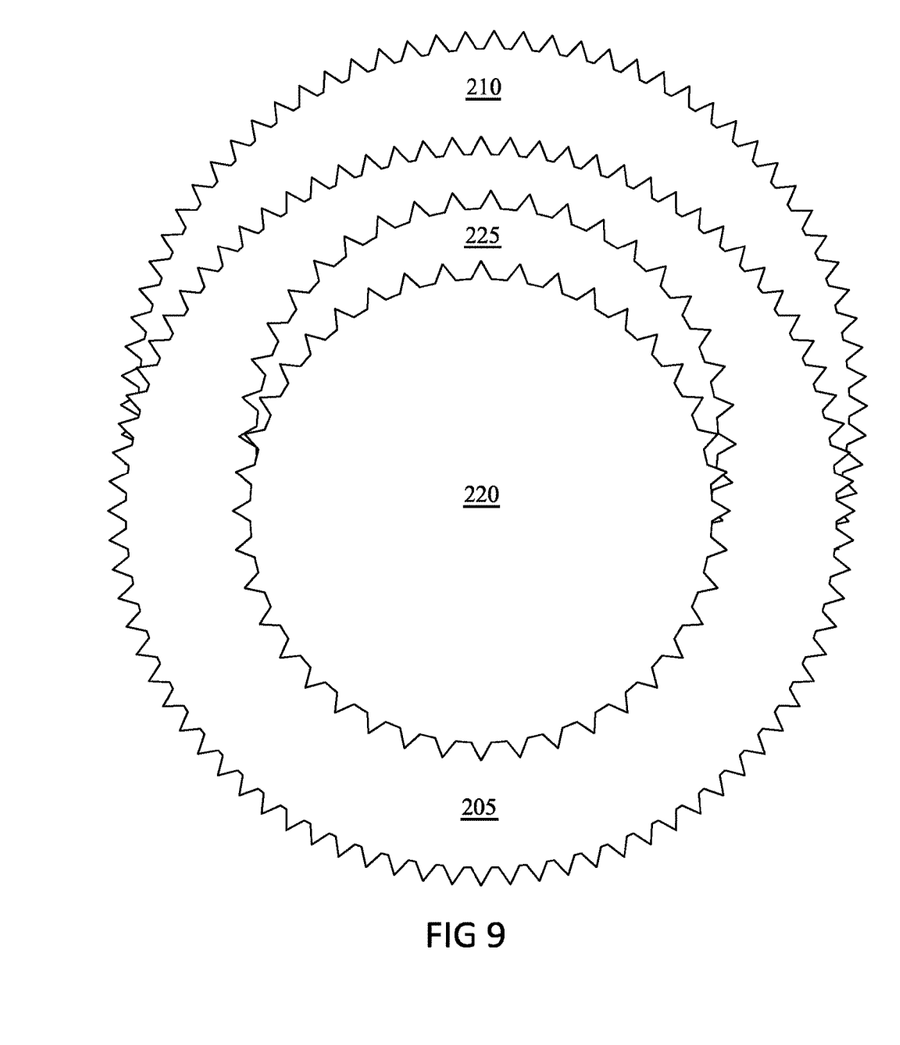
FIG. 9 depicts a front view of the power drill accessory in the second state, according to some embodiments.

The first knurled assembly 115 and the second knurled assembly 120 each selectively expand laterally, which allows one of the components to engage the wall of a pipe when the power drill accessory is inserted therein. Once the wall is engaged, the the power drill circumferentially rotates the power drill accessory 100 and thereby circumferentially rotate the pipe. The first cam shaft 305 is cross-sectionally offset with the first knurled disc 200 and the second knurled disc 205. The first knurled disc 200 is affixed to the first cam shaft 305. The second knurled disc 205 is affixed to the first cam shaft 305 opposite the first knurled disc 200. The first knurled disc 200 and the second knurled disc 205 preferably have the same size, structures and features. The second knurled assembly 120 is diametrically larger than the stem 105 and the shaft 110. The second knurled assembly 120 includes a second plurality of ridges 135 (e.g., to help the second knurled assembly 120 engage the inner wall of pipes and lodge itself therein). The second plurality of ridges 135 are preferably circumferentially positioned about the second knurled assembly 120 and longitudinally aligned thereon.

Figure 10:
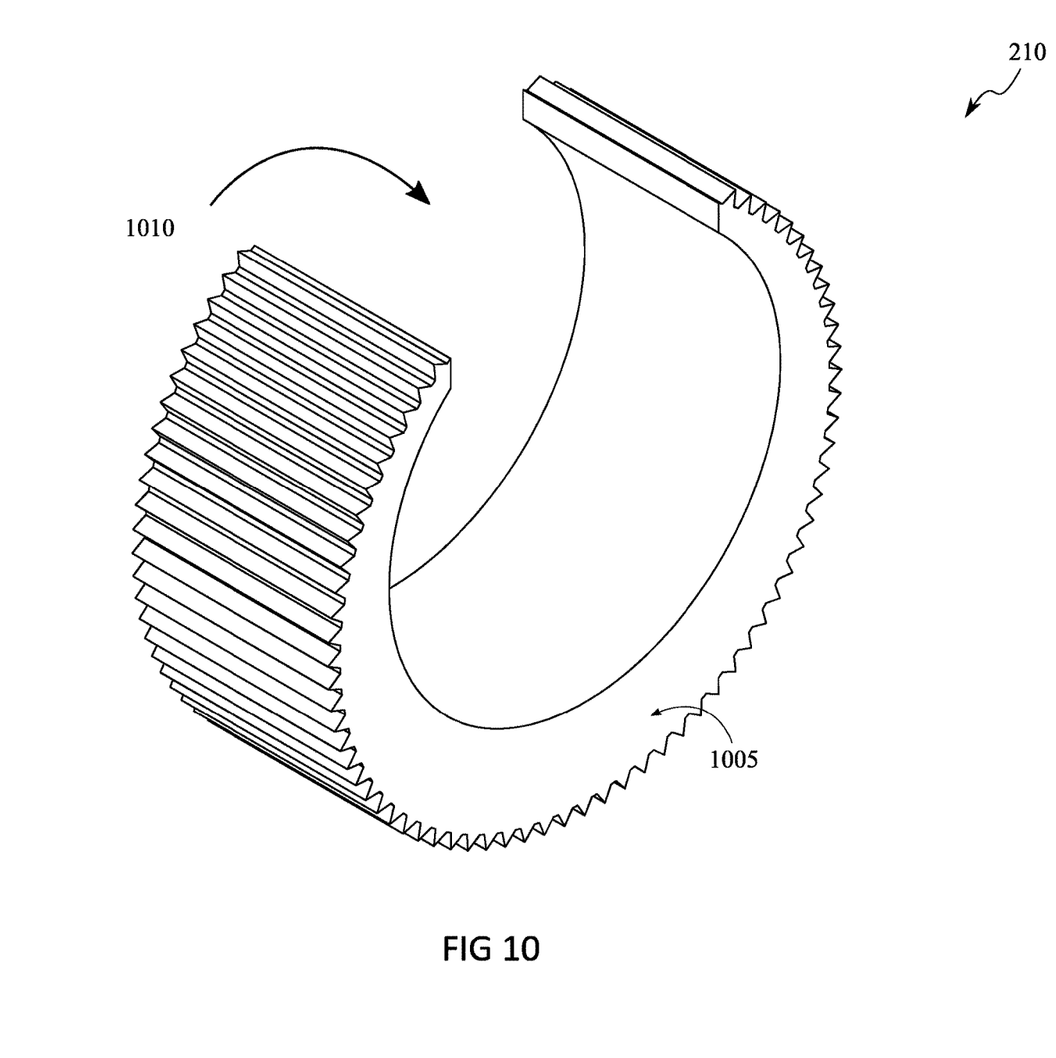
FIG. 10 depicts a perspective view of a first knurled cam, according to other embodiments.
Figure 11:
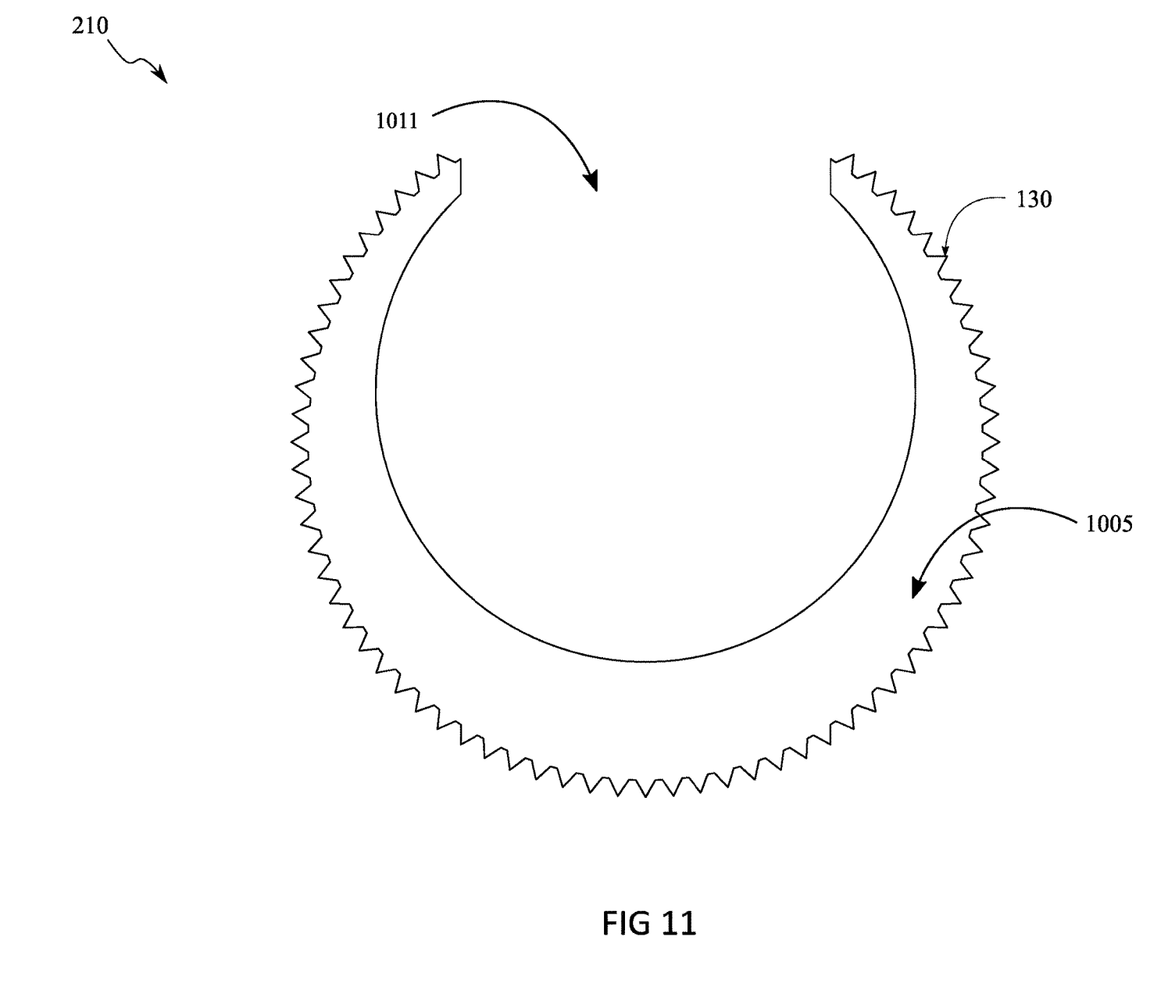
FIG. 11 depicts a side view of the first knurled cam, according to certain embodiments.

The first cam shaft 305 and the first hole 1010 are diametrically similar. The first knurled cam 210 is rotatably and slidably coupled to the first cam shaft 305. The first cam shaft 305 is cross-sectionally offset with each of the first knurled disc 200 and the second knurled disc 205. The first knurled cam 210 includes a first front face 1005 and a first hole 1010. The first front face 1005 and the first hole 1010 are cross-sectionally offset from each other. The first front face 1005 is diametrically larger than the first hole 1010. The first knurled cam 210 is cross-sectionally crescent shaped. It can be preferred that the that first knurled cam 210 be positioned on the side surface of the first cam shaft 305 such that the first knurled cam 210 can freely rotate about or on the side surface of the first cam shaft 305.

Figure 12:
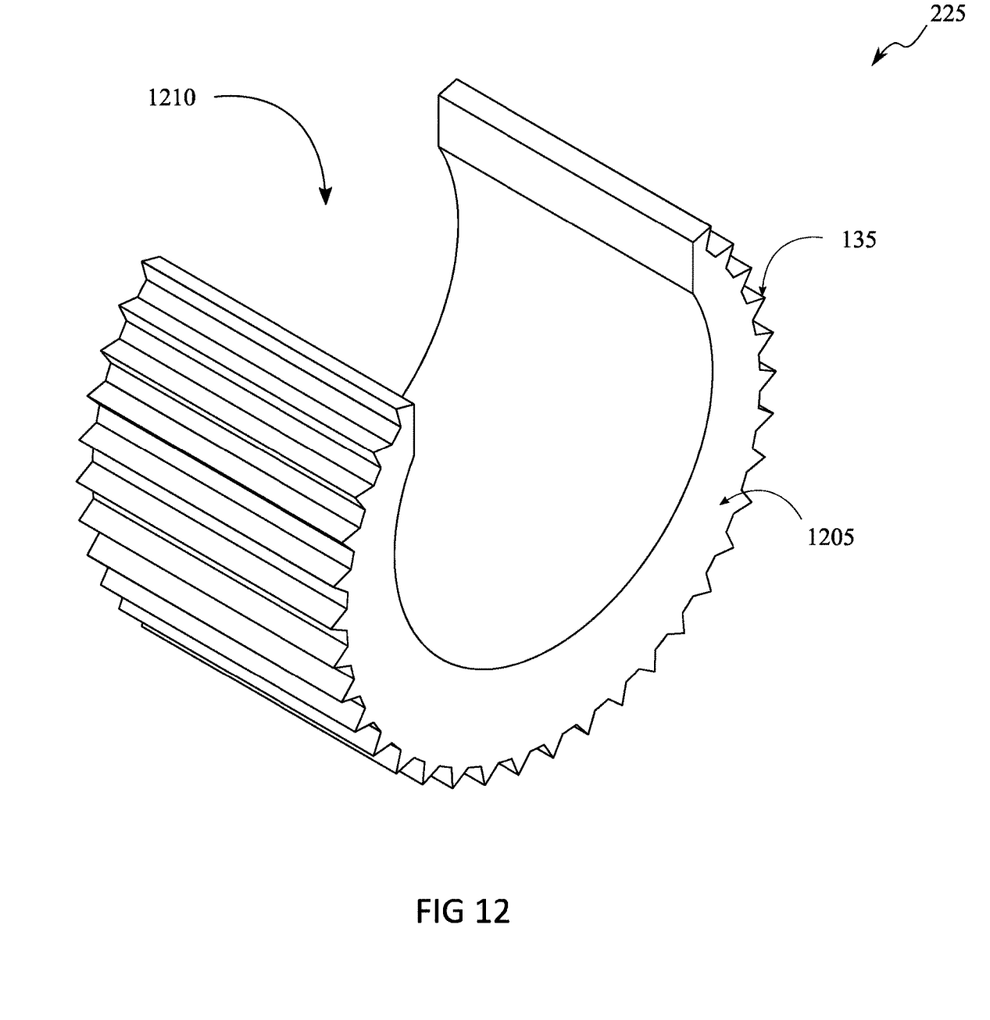
FIG. 12 depicts a perspective view of a second knurled cam, according to yet still others embodiments.
Figure 13:
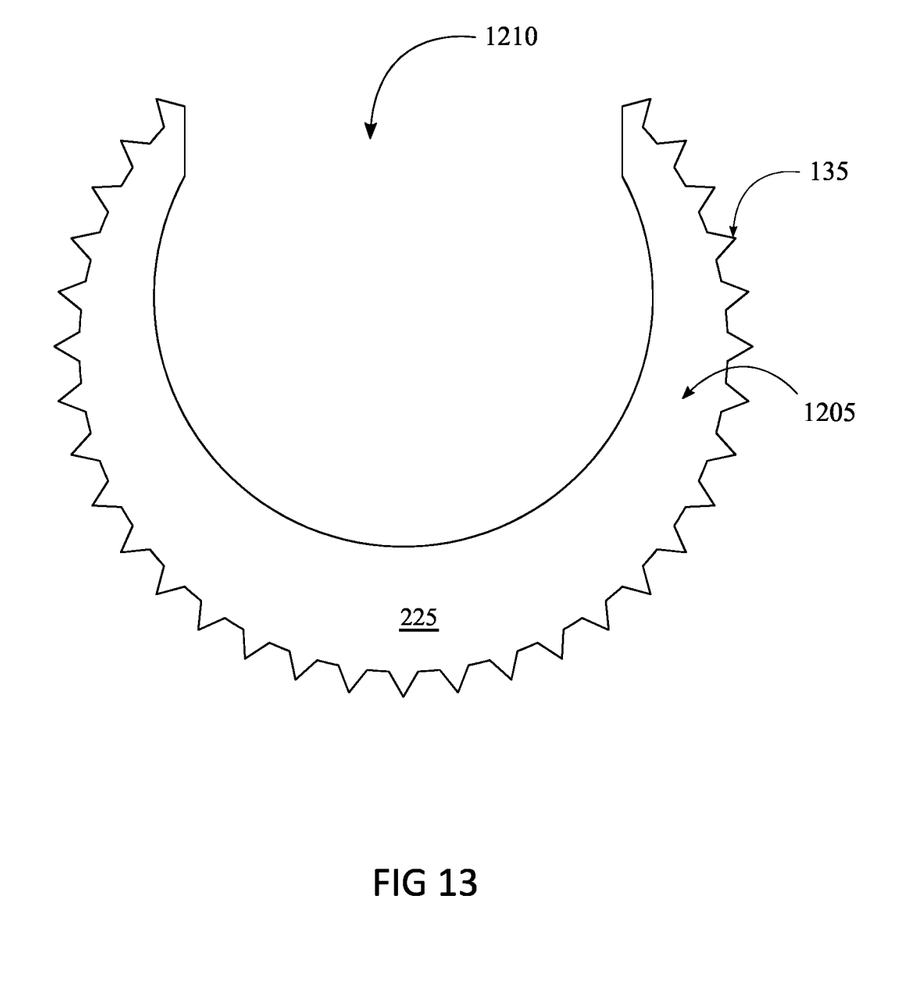
FIG. 13 depicts a side view of the second knurled cam, according to some embodiments.

Similar to the first knurled cam 210, the second knurled cam 225 includes a second front face 120, a second hole 1210. The second front face 120 and the second hole 1210 are cross-sectionally offset from each other. The second front face 1205 is diametrically larger than the second hole 1210. The second knurled cam 225 is cross-sectionally crescent shaped. It can be preferred that the that second knurled cam 225 be positioned on the side surface of the second cam shaft 310 such that the second knurled cam 225 can freely rotate about or on the side surface of the second cam shaft 310. The second cam shaft 310 is cross-sectionally offset with the third knurled disc 215 and the fourth knurled disc 220. The second cam shaft 310 and the second hole 1210 are diametrically similar.

Figure 14:
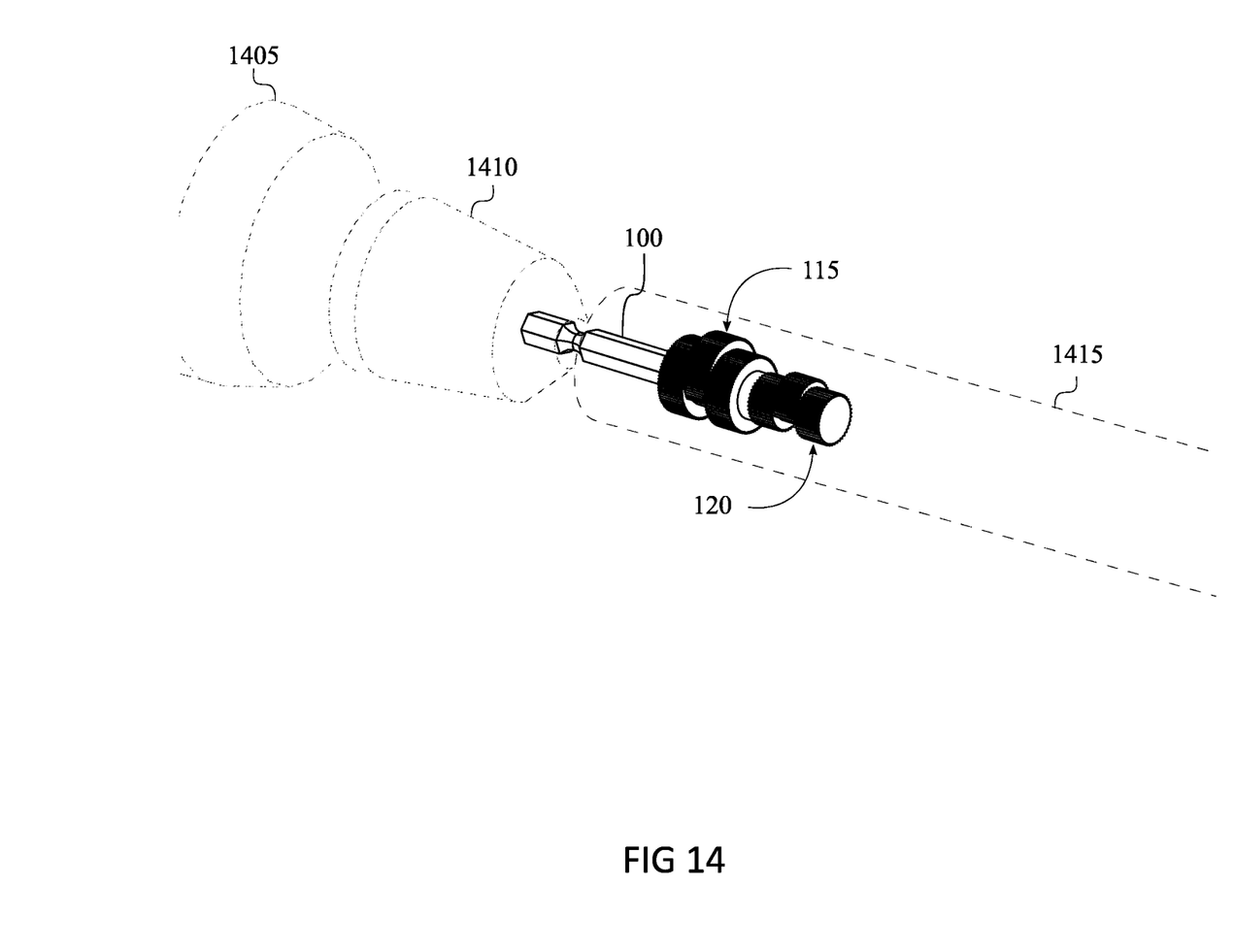
FIG. 14 depicts an environment to facilitate pipe spinning using the power drill accessory, according to other embodiments.

FIG. 14 depicts an environment to facilitate pipe spinning using the power drill accessory 100, according to other embodiments. As depicted, the stem 105 is preferably configured to be inserted into the chuck 1410 of a power drill 1405. In the first state 140, the "working end" of the power drill accessory 100 (i.e., the first knurled assembly 115 and the second knurled assembly 120) is inserted into the pipe 1415. When the power drill 1405 is activated, the chuck 1410 rotates the power drill accessory 100 and, depending on the diameter of the piper, either the first knurled assembly 115 or the second knurled assembly 120 engages the inner wall of pipe 1415 and laterally expands, and thereby cause the power drill accessory 100 to reconfigure to the second state 740. Although the disclosure has been explained in relation to its preferred embodiment, it is to be understood that many other possible modifications and variations can be made without departing from the spirit and scope of the disclosure.

What is claimed is:

1. A power drill accessory, comprising:
   a stem;
   a shaft;
   a first knurled assembly;
   a second knurled assembly;
   a first state;
   a second state;
   wherein
     the first knurled assembly and the second knurled assembly are each cylindrically shaped;
     the first knurled assembly is centrally affixed to the stem;
     the shaft is centrally affixed to the first knurled assembly opposite the stem;
     the second knurled assembly is centrally affixed to the shaft opposite the first knurled assembly;
     the first knurled assembly and the second knurled assembly each selectively expand laterally;
     in the first state, the first knurled assembly and the second knurled assembly are each not laterally expanded;
     in the second state, at least one of the first knurled assembly and the second knurled assembly are laterally expanded;
     the stem is configured to be inserted into a chuck of a power drill;
   the first knurled assembly comprises:
     a first knurled disc;
     a second knurled disc;
     a first knurled cam;
     a first cam shaft;
   wherein
     the first knurled disc is affixed to the first cam shaft;
     the second knurled disc is affixed to the first cam shaft opposite the first knurled disc;
     the first knurled cam is rotatably and slidably coupled to the first cam shaft;
     the first cam shaft is cross-sectionally offset from each of the first knurled disc and the second knurled disc;
   the second knurled assembly comprises:
     a third knurled disc;
     a fourth knurled disc;
     a second knurled cam;
     a second cam shaft;
   wherein
     the third knurled disc is affixed to the second cam shaft;
     the fourth knurled disc is affixed to the second cam shaft opposite the third knurled disc;
     the second knurled cam is rotatably and slidably coupled to the second cam shaft;
     the second cam shaft is cross-sectionally offset from each of the third knurled disc and the fourth knurled disc;
   the first knurled cam is cross-sectionally crescent shaped; and
   the second knurled cam is cross-sectionally crescent shaped.

2. The power drill accessory of claim 1, wherein the stem
   is cross-sectionally hexagonally shaped;
   comprises a region of decreased diameter;
   the region of decreased diameter
     is diametrically smaller compared to the stem; and
     is positioned proximate to the chuck when the stem is inserted therein.

3. The power drill accessory of claim 2, wherein the first knurled cam comprises
   a first front face;
   a first hole;
   wherein the first front face and the first hole are cross-sectionally offset from each other; and
   wherein the first front face is diametrically larger than the first hole.

4. The power drill accessory of claim 3, wherein the second knurled cam comprises
   a second front face;
   a second hole;
   wherein the second front face and the second hole are cross-sectionally offset from each other; and
   wherein the second front face is diametrically larger than the second hole.

5. The power drill accessory of claim 4, wherein the first knurled assembly is diametrically larger than the stem, the shaft, and the second knurled assembly; and the second knurled assembly is diametrically larger than the stem and the shaft.

6. The power drill accessory of claim 5, wherein
the first knurled assembly comprises a first plurality of ridges; and
the second knurled assembly comprises a second plurality of ridges.

7. The power drill accessory of claim 6, wherein
the first cam shaft is cross-sectionally offset with the first knurled disc and the second knurled disc;
the second cam shaft is cross-sectionally offset with the third knurled disc and the fourth knurled disc;
the first cam shaft and the first hole are diametrically similar; and
the second cam shaft and the second hole are diametrically similar.

8. A power drill accessory, comprising:
a stem;
a shaft;
a first knurled assembly;
a second knurled assembly;
a first state;
a second state;
wherein
  the stem
    is cross-sectionally hexagonally shaped;
    comprises a region of decreased diameter;
  the region of decreased diameter
    is diametrically smaller compared to the stem;
    is positioned proximate to the chuck when the stem is inserted therein
  the first knurled assembly and the second knurled assembly are each cylindrically shaped;
  the first knurled assembly is centrally affixed to the stem;
  the shaft is centrally affixed to the first knurled assembly opposite the stem;
  the second knurled assembly is centrally affixed to the shaft opposite the first knurled assembly;
  the first knurled assembly and the second knurled assembly each selectively expand laterally;
  in the first state, the first knurled assembly and the second knurled assembly are each not laterally expanded;
  in the second state, at least one of the first knurled assembly and the second knurled assembly are laterally expanded;
  the stem is configured to be inserted into a chuck of a power drill;
the first knurled assembly comprises:
  a first knurled disc;
  a second knurled disc;
  a first knurled cam;
  a first cam shaft;
wherein
  the first knurled disc is affixed to the first cam shaft;
  the second knurled disc is affixed to the first cam shaft opposite the first knurled disc;
  the first knurled cam is rotatably and slidably coupled to the first cam shaft;
  the first cam shaft is cross-sectionally offset from each of the first knurled disc and the second knurled disc;
the second knurled assembly comprises:
  a third knurled disc;
  a fourth knurled disc;
  a second knurled cam;
  a second cam shaft;
wherein
  the third knurled disc is affixed to the second cam shaft
  the fourth knurled disc is affixed to the second cam shaft opposite the third knurled disc;
  the second knurled cam is rotatably and slidably coupled to the second cam shaft;
  the second cam shaft is cross-sectionally offset from each of the third knurled disc and the fourth knurled disc;
the first knurled cam is cross-sectionally crescent shaped; and
the second knurled cam is cross-sectionally crescent shaped.

9. The power drill accessory of claim 8, wherein
the first knurled cam comprises
  a first front face;
  a first hole;
wherein the first front face and the first hole are cross-sectionally offset from each other; and
wherein the first front face is diametrically larger than the first hole.

10. The power drill accessory of claim 9, wherein
the second knurled cam comprises
  a second front face;
  a second hole;
wherein the second front face and the second hole are cross-sectionally offset from each other; and
wherein the second front face is diametrically larger than the second hole.

11. The power drill accessory of claim 10, wherein
the first knurled assembly is diametrically larger than the stem, the shaft, and the second knurled assembly; and
the second knurled assembly is diametrically larger than the stem and the shaft.

12. The power drill accessory of claim 11, wherein
the first knurled assembly comprises a first plurality of ridges; and
the second knurled assembly comprises a second plurality of ridges.

13. The power drill accessory of claim 12, wherein
the first cam shaft is cross-sectionally offset with the first knurled disc and the second knurled disc;
the second cam shaft is cross-sectionally offset with the third knurled disc and the fourth knurled disc;
the first cam shaft and the first hole are diametrically similar; and
the second cam shaft and the second hole are diametrically similar.

* * * * *